United States Patent [19]
Hostettler

[11] 3,931,387
[45] Jan. 6, 1976

[54] CATALYST SYSTEM FOR INJECTION MOLDING POLYURETHANES
[75] Inventor: Fritz Hostettler, Freehold, N.J.
[73] Assignee: Inter-Polymer Research Corporation, Farmingdale, N.J.
[22] Filed: Apr. 17, 1973
[21] Appl. No.: 351,859

[52] U.S. Cl. ..... 264/328; 260/75 NC; 260/77.5 AC; 264/331
[51] Int. Cl.² ..................... C08G 18/24; B29G 3/00
[58] Field of Search .. 260/75 NE, 77.5 AA, 2.5 BC, 260/2.5 AC, 77.5 AC, 25 BC, 75 NC; 264/328

[56] References Cited
UNITED STATES PATENTS

| | | | |
|---|---|---|---|
| 2,969,960 | 1/1961 | Gurley | 260/2.5 BD |
| 3,188,296 | 6/1965 | Hoppe et al. | 260/2.5 BD |
| 3,201,358 | 8/1965 | Hostettler et al. | 260/77.5 AC |
| 3,215,652 | 11/1965 | Kaplan | 260/2.5 AC |
| 3,372,130 | 3/1968 | Chess et al. | 260/2.5 AC |
| 3,392,153 | 7/1968 | Hostettler et al. | 260/2.5 AB |
| 3,397,158 | 8/1968 | Britain et al. | 260/77.5 AC |
| 3,398,106 | 8/1968 | Hostettler et al. | 260/2.5 AB |
| 3,438,908 | 4/1969 | Reymore et al. | 260/77.5 AC |
| 3,476,933 | 11/1969 | Mendelsohn | 260/2.5 AC |
| 3,520,835 | 7/1970 | Chandley et al. | 260/77.5 AC |
| 3,767,602 | 10/1973 | Carroll et al. | 260/2.5 AC |
| 3,769,244 | 10/1973 | Hashimoto et al. | 260/77.5 AC |
| 3,772,221 | 11/1973 | Hostettler et al. | 260/77.5 AC |
| 3,814,707 | 6/1974 | Moeller et al. | 260/77.5 AC |
| 3,822,223 | 7/1974 | Gemeinhardt et al. | 260/77.5 AC |
| 3,822,223 | 7/1974 | Gemeinhardt et al. | 260/2.5 AC |

OTHER PUBLICATIONS

"Desma Fair Information", a publication of Desma–Werke GmbH, D2807, Achim (Germany). Undated.
Saunders et al. Polyurethanes Part II, Interscience, New York (1964) pp. 201–202.

Primary Examiner—H. S. Cockeram
Attorney, Agent, or Firm—Watson Leavenworth Kelton & Taggart

[57] ABSTRACT

A polyurethane catalyst system is disclosed which comprises:
a. at least one basic amine catalyst for the polyurethane reaction having a catalytic activity about equal to or greater than triethylenediamine;
b. at least one organometallic catalyst for the polyurethane reaction; and
c. at least one basic amine catalyst for the polyurethane reaction having a catalytic activity less than that of (a) and (b) together present in the catalyst system in an amount by weight about equal to or greater than the combined weight of catalysts (a) and (b).

1 Claim, No Drawings

CATALYST SYSTEM FOR INJECTION MOLDING POLYURETHANES

BACKGROUND OF THE INVENTION

1. Field of the Invention

This invention relates to the field of polymerization catalysts for polyurethanes.

2. Description of the Prior Art

Numerous catalysts and catalyst systems for the polyurethane reaction are known.

The polyurethane polymerization technique of the "one-shot" type for the manufacture of urethane elastomers generally comprises reacting a hydroxyl-terminated polyether diol or hydroxyl terminated polyester diol of about 2,000 molecular weight, a bifunctional extender and an organic diisocyanate in the presence of a basic amine catalyst such as triethylenediamine (DABCO), an organometallic catalyst such as tin acylate, dibutyltin diacylate or phenyl mercuric acylate, or blends of these and similar catalysts.

The same catalysts and catalyst systems can be employed for the polymerization technique of the "prepolymer" type in which a prepolymer derived from the reaction of the aforedescribed diols with an excess of an organic diisocyanate to provide terminal isocyanate groups thereon is reacted with a bifunctional extender.

Typically, these catalysts and catalyst blends provide gel times of under 1 minute, and generally, under thirty seconds. For certain types of polyurethane polymerization processes, in particular, for the liquid injection molding of polyurethane elastomers, it is often highly desirable to employ a catalyst or catalyst system which results in gel times well in excess of one minute.

SUMMARY OF THE INVENTION

It has been surprisingly discovered that a polyurethane catalyst system comprising (a) at least one basic amine catalyst for the polyurethane reaction having a catalytic activity about equal to or greater than triethylenediamine, (b) at least one organometallic catalyst for the polyurethane reaction; and (c) at least one basic amine catalyst for the polyurethane reaction having a catalytic activity less than that of catalysts (a) and (b) together present in the catalyst system in an amount by weight about equal to or greater than catalysts (a) and (b) results in dramatically increased gel times, in some cases, up to 120 seconds or more.

The catalyst system of this invention is advantageously employed in any polyurethane polymerization process wherein prolonged gel times are desirable. For example, the catalyst system of this invention can be advantageously used in the polyurethane elastomer liquid injection molding processes of commonly assigned, copending U.S. patent application Ser. Nos. 429,406 and 429,381, both filed Apr. 17, 1973.

DESCRIPTION OF THE PREFERRED EMBODIMENTS

While the catalyst system of this invention is useful for the polymerization of all polyurethane reaction mixtures in which prolonged gel times are desired, the system is particularly useful for polymerizing liquid reaction mixtures for polyurethane elastomers produced by liquid injection molding methods.

One such liquid reaction mixture which has been polymerized with a catalyst system of this invention generally comprises (a) a solution or dispersion of at least one polyether diol, polyester diol or mixture thereof, advantageously of about 2,000 molecular weight average, at least one organic bifunctional extender selected to be a diamine, aminoalcohol or glycol and an effective amount of a catalyst system as will be hereinafter disclosed, combined in a high speed mixing and injecting apparatus (mixing screw capable of speeds in excess of 10,000 r.p.m.) with (b) a prepolymer resulting from the reaction of at least one polyether diol, polyester diol or mixture thereof, advantageously, of about 2,000 molecular weight average, with at least one organic diisocyanate to provide the prepolymer with an average ratio of free isocyanate groups to hydroxyl groups greater than about 2:1.

It has been most unexpectedly observed that addition of any amine catalyst for the polyurethane reaction known to have a catalytic activity less than triethylenediamine when added to a normally catalyzed polyurethane reaction utilizing a catalyst system comprising triethylene-diamine and commonly employed organometallic secondary catalysts results in much longer gel times for the above reaction, for example, up to two minutes or more. With one known and conventional catalyst system, 0.2 parts triethylenediamine, 0.2 parts dialkyltin diazelate and 0.4 parts phenyl mercuric propionate per 100 parts of polymerization mixture formulations based upon the above reactants gave average gel times of about 25 seconds. However, when this same catalyst system was combined with 1.0 part of a catalyst (c) according to this invention, for example, N-methyldicyclohexylamine, the N-alkylmorpholines such as N-methylmorpholine and tetramethylguanidine, gel times for the same formulations consistently averaged about 90 seconds. Lengthier gel times permit liquid injection molding of large amounts of polymerization mixture without the need for using slow reacting extenders such as the alkylene glycols and hindered amines such as methylenebis (orthochloroaniline) (MOCA). Consequently, the overall rate of production is increased with a concomitant lower unit cost when the catalyst systems of this invention are employed in polyurethane elastomer liquid injection molded reaction mixtures.

I claim:

1. A process for preparing polyurethane elastomers which comprises combining:
   a. at least one polyether diol, polyester diol or mixture thereof, at least one organic bifunctional extender selected to be a diamine, aminoalcohol or glycol having a rate of reactivity greater than the alkylene glycols and the hindered amines, and a catalytically effective amount of a catalyst system comprising per 100 parts of polymerization mixture,
      i. 0.2 parts of triethylenediamine
      ii. 0.6 parts of an organometallic catalyst selected to be a dialkyltin diazelate, phenyl mercuric propionate, or combination thereof, and
      iii. at least 0.8 parts of a basic amine catalyst selected to be N-methyldicyclohexyl amine, an N-alkylmorpholine, or a combination thereof; and
   b. a prepolymer resulting from the reaction of at least one polyether diol, polyester diol or mixture thereof with at least one organic diisocyanate in proportions such that the ratio NCO/OH is greater than about 2:1 in a mixing and injecting apparatus under a mixing screw speed in excess of 10,000 r.p.m., injecting the liquid mixture into a mold and curing the contents of the mold.

* * * * *